Patented June 29, 1943

2,323,277

UNITED STATES PATENT OFFICE 2,323,277

SATURATED AND UNSATURATED PREG-
NANE COMPOUNDS AND PROCESS OF
MAKING SAME

Karl Miescher, Riehen, and Albert Wettstein,
Basel, Switzerland, assignors to Ciba Pharma-
ceutical Products, Incorporated, Summit, N. J.

No Drawing. Application January 22, 1941, Se-
rial No. 375,540. In Switzerland January 17,
1940

11 Claims. (Cl. 260—397.5)

It has been found that saturated and unsaturated pregnane polycarbonyl compounds or their substitution products with, for example, additional oxo or free or substituted hydroxyl groups, may be obtained by treating pregnane-20-ones, containing in the rings A or B merely double bonds with oxidizing agents, if desired after treatment with reducing and esterifying or etherifying agents, and finally, if desired, treating with hydrolyzing, acylating agents and/or oxidizing, dehydrogenating, water or acid eliminating agents.

The parent materials named are obtained, among other means, according to specification Ser. No. 371,058, by the degradation of the side chains of corresponding dimethyl-cyclopentano-polyhydrophenanthrene compounds containing side chains. They contain double bonds particularly in the 2, 3, 4 or 5 positions.

By reducing agents, those agents are to be understood which are suitable for the conversion of the 20-keto group into a carbinol group. If desirable, the 20-carbinols thus obtained are converted into their esters or ethers by the action of corresponding esterifying or etherifying agents in a manner of itself known. In this instance particular use is made of esterifying agents which are capable of introducing aliphatic acid radicals, such as those of formic, acetic, propionic, n- or iso-butyric, n- or iso-valeric, caproic, capric, palmitic, or stearic acids, as well as those which introduce the radicals of aromatic, fatty aromatic or inorganic acids, for example, the radicals of benzoic, cinnamic or substituted carbonic acids. For the etherification, radicals are introduced of aliphatic or aliphatic-aromatic alcohols or phenols, for example, methyl, ethyl, benzyl, or triarylmethyl radicals and the like. A reduction of the 20-keto group to the carbinol group and, if desired, subsequent esterification or etherification is indicated if, in the subsequent oxidation, an oxidizing agent is used which will oxidize also the 21-methyl group standing in α-position to the 20-keto group, should such a conversion be undesirable.

Oxidizing agents are now caused to react upon the unsaturated compounds, particularly those capable of introducing in a manner of itself known oxygen or groups containing oxygen in the α-position to the double bond and, if desired, to the keto group. These are, for example, chromic acid, selenium dioxide, lead tetracylates, and so on, all of which lead to compounds containing oxo, hydroxy or substituted hydroxyl groups in the α-position. In place of those mentioned, it is also possible to cause agents to act on the unsaturated substances, particularly those having double bonds in the 2- or 3-position, which are capable of adding oxygen or groups containing oxygen directly or indirectly to the double bond itself. For this purpose are suitable, for example, peroxides, such as hydrogen peroxide, if desired, in the presence of alkalies or metal oxides. Furthermore there are suitable per-acids, halogens, metal oxides, such as osmium tetroxide or vanadic acid, if desired, in the presence of chlorates, also permanganates, lead tetracylates, aryl iodosoacylates, or halogen-silver benzoate complexes. In order to convert substituted hydroxyl groups or newly introduced epoxi groupings into free hydroxyl groups, the reaction products are further treated if desired with hydrolyzing agents, in which case it is also possible, by carefully controlled action, only partially to hydrolyze the substituents in the rings A and B but not the substituted hydroxyl group possibly present in the 17-position; on the other hand, partially substituted polyhydroxy compounds may also be obtained by partial substitution of the free polyalcohols, making use of the particularly ready activity of, for instance, a hydyroxyl group in the 21-position in regard to acylation agents, for example.

In this manner, compounds of the dimethyl-cyclopentanopolyhydrophenanthrene series have been obtained which contain a keto group or a free hydroxyl group in the 20-position, if desired a free or acylated hydroxyl group in the 21- and/or 17-position or an aldehyde group in the 21-position, and which contain in the rings A or B keto groups or free or esterified hydroxyl groups in α-position to double bonds, or else two adjacent free or esterified hydroxyl groups in the rings A or B. From the compounds which contain hydroxyl groups in the rings A or B or in the 20-position, the desired saturated or unsaturated pregnane polycarbonyl compounds or their substitution products may subsequently be obtained in a manner of itself known by the action of oxidizing or dehydrogenating agents or of agents eliminating water or acid.

The following scheme illustrates by means of formulae some of the above reactions without in any way restricting the invention. For example, the compound of Formula I or that of Formula VIII may be used as parent material.

means of a nickel catalyst, prepared, for example, by Rupe's or Raney's method. After 1 molecule of hydrogen has been absorbed the hydrogenation is interrupted, the reaction solution is filtered from the catalyst and the filtrate is evaporated in vacuo. The residue, consisting of a mixture of epimeric Δ⁴-pregnene-20-oles, is

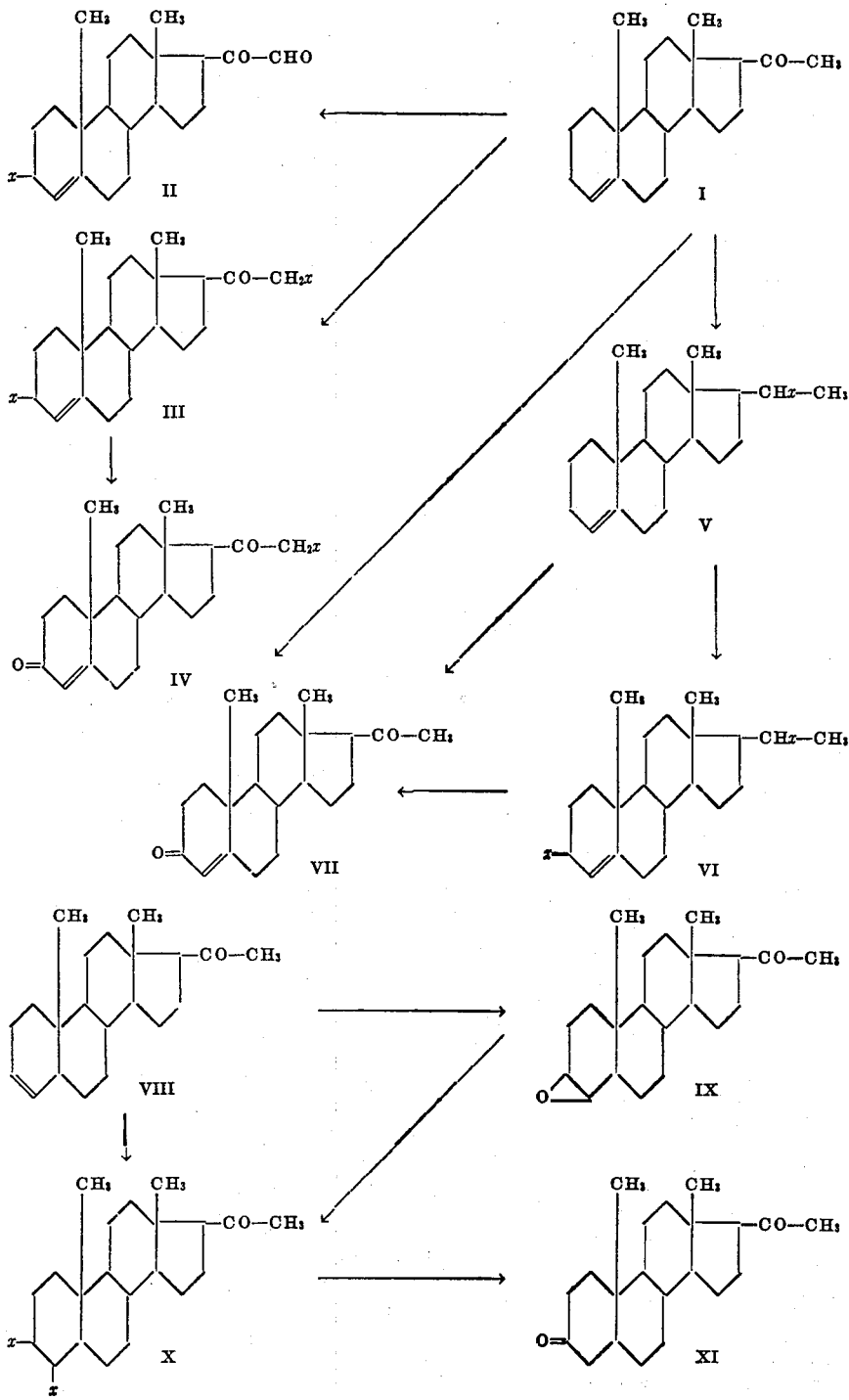

$x$=free or substituted hydroxyl group.

*Example 1*

1 part of Δ⁴-pregnene-20-one of the Formula I (prepared, for example, according to specification Ser. No. 371,058 by partially splitting the side chain in Δ⁴-cholestene) is dissolved in 25 parts of pure alcohol and is hydrogenated by dissolved in 6 parts of absolute pyridine. 2 parts of propionic acid anhydride are now added, and the solution is maintained for 16 hours at room temperature when it is poured into 50 parts of water. After the anhydride has decomposed, the resulting ester crystallizes, is removed by suction at the pump, washed with water and dried in the vacuum exsiccator. By recrystalization from hexane a mixture of epimeric Δ⁴-pregnene-20-ole-propionates is obtained in the form of colorless crystals. These have the Formula V(x=—OCO—C₂H₅).

In place of a catalytic hydrogenation, the reduction may be carried out by means of nascent hydrogen, for example, of an alkali metal and an alcohol, by means of an organo-metal compound prone to form unsaturated hydrocarbons, such as iso-propyl-magnesium iodide, or even by biochemical or electrochemical means. In place of propionic acid anhydride, other propionylating agents may naturally be used, for example, a propionic acid halide, or other desired esters or ethers may be prepared.

In place of the radical of propionic acid, other ester or ether radicals may be introduced, for example those named before, or the new carbinol group may rest unprotected.

If, instead of using Δ⁴-pregnene-20-one as parent substance, a parent material which is unsaturated in another position be used, for example, Δ²-, Δ³- or Δ⁵-pregnene-20-one, the corresponding unsaturated product is analogously obtained.

Thus quite generally as intermediates pregnane derivatives are obtained containing in the rings A and B merely a double bond and in 20-position a free, esterified or etherified hydroxyl group; for example the Δ²-, Δ³-, Δ⁴- or Δ⁵-pregnene-20-ole-acylates.

1 part of the mixture of epimeric Δ⁴-pregnene-20-ole-propionates (Formula V: x=—OCO—C₂H₅)

already described is heated with 2.2 parts of lead tetracetate and 25 parts of glacial acetic acid for some time at 75° C. with exclusion of moisture. The reaction mixture is then filtered, the filtrate is evaporated in vacuo, water is added and the resulting mixture is exhaustively extracted with ether. The ethereal solution is washed with soda solution and water, dried and evaporated. The residue is taken up in hexane and is chromatographed with the aid of aluminium oxide. Δ⁴ - pregnene - 3,20 - diol - 3 - acetate - 20 - propionate is obtained as chief product (Formula VI: x=—OCOCH₃ and —OCO—C₂H₅).

The diester may be saponified by boiling for 2 hours with a 5 percent solution of potassium hydroxide in methanol. In this way, a preparation of sterically isomeric Δ⁴-pregnene-3,20-diols (Formula VI; x=OH) is obtained. As α,β-unsaturated alcohols, these compounds give a strongly positive reaction with trichloroacetic acid. In order to oxidize or dehydrogenate them, they are treated, either with intermediate protection of the double bond by bromination, with chromic acid in glacial acetic acid, or, without this intermediate protection, with an aluminium alcoholate in the presence of a ketone, such as acetone or cyclohexanone. In this way, the known Δ⁴-pregnene-3,20-dione (Progesterone) of Formula VII is obtained.

For the first oxidation, selenium oxide or chromic acid, for example, may be used instead of lead tetracetate. In this case, Δ⁴-pregnene-3,20-diol-20-propionates or -3-one-20-ole-propionates are primarily obtained, which are subsequently saponified and then may also be converted into progesterone by the action of oxidizing or dehydrogenating agents in a manner of itself known.

Example 2

1 part of Δ⁴-pregnene-20-one (Formula I) is dissolved in 50 parts of glacial acetic acid; a solution of 1.2 parts of chromium trioxide in a little water is added and the whole is stirred for 12 hours at room temperature, after which 400 parts of water are added. The reaction mixture is exhaustively extracted with ether, and the ethereal solution is washed with bicarbonate solution and water, dried and evaporated in vacuo. From the residue, progesterone (Δ⁴-pregnene-3,20-dione) of Formula VII, in addition to corresponding 6-oxo- and 3,6-dioxo-compounds, is obtained by fractional crystallization, adsorption or sublimation.

In place of chromic acid, selenium dioxide or a lead tetracylate, for example, may also be used for the oxidation. In this case, Δ⁴-3-hydroxy- or -acyloxy compounds with an aldehyde group in the 21-position (Formula II) or an acyloxy group in the 21- and/or 17-position (such as that of Formula III) are primarily obtained. The latter compound may be converted into desoxy-corticosterone-acylates or ethers, for example into desoxy-corticosterone-acetate (21-acetoxy-pregnene-3,20-dione) of Formula IV (x=-OCO-CH₃), by saponification of the ester groups, subsequent partial acylation or etherification in the 21-position and action of oxidizing or dehydrogenating agents in a manner of itself known.

Example 3

1 part of Δ³-pregnene-20-one of Formula VIII (prepared, for example, according to specification Ser. No. 371,058 by partially splitting the side chain in Δ³-cholestene) is dissolved in ether and an ethereal solution of 1.1 equivalents of osmium tetroxide is added. The reaction mixture is allowed to stand for 5 days at room temperature, after which it is completely evaporated at a bath temperature of 30° C., and the residue is heated in aqueous-alcoholic solution for 2 hours with 2 parts of sodium sulphite. For the reductive hydrolysis of the osmic acid ester other reducing agents, for example, acid agents, such as ascorbic acid or formic acid, may be used. The filtered reduction mixture is poured into water, exhaustively extracted with chloroform, the chloroform solution is washed with water, dried and evaporated. From the residue, pregnene-3,4-diol-20-one (Formula X; x=OH) is obtained by recrystallization from acetone or dilute methanol.

In place of the direct addition of the two hydroxyl groups to the double bond, an oxide ring, or either one or both of the hydroxyl groups in substituted form, for example, in acylated form, may first be added, in which case use is made of reagents of themselves known, for example, of the reagents mentioned above in this specification. The oxide ring or substituted hydroxyl groups may subsequently be saponified, if desired, the latter wholly or partially.

As the final stage of the process, for example, agents or means which eliminate water such as alkali bisulphates, dry vacuum distillation or many others, may be caused to act on the pregnane-3,4-diol-20-one in a manner or itself known. If the hydroxyl group in the 4- and/or 3-position be present in esterified form, which is the case, for example, when peracetic acid, lead tetrabenzoate or a halogen-silver benzoate complex has been used for the hydroxylation, then an agent which eliminates acid is used in place of the above agents, for example, zinc dust in toluene or xylene, alkali carbonates, if desired, after the action of oxidizing or dehydrogenating agents if one hydroxyl group is free, in order to convert this into a keto group. In this manner, for example, pregnane-3,20-dione of Formula XI or progesterone of Formula VII may be obtained.

What we claim is:

1. A pregnane derivative containing in the rings A and B merely a double bond, namely in one of the positions 2, 3, 4 and 5, and in 20-position a member of the group consisting of a hydroxyl group and a group which upon hydrolysis is convertible into a hydroxyl group.

2. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely double bonds, with an oxidizing agent capable of introducing groups containing oxygen into the said rings.

3. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely a double bond, with an oxidizing agent capable of introducing esterified hydroxyl groups into the said rings, and then with a hydrolyzing agent.

4. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely a double bond, with an oxidizing agent capable of introducing esterified hydroxyl groups into the said rings, and then with a hydrolyzing agent and finally with a member of the group consisting of an oxidizing and a dehydrogenating agent.

5. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely a double bond, with an oxidizing agent capable of introducing esterified hydroxyl groups into the said rings, and then with a hydrolyzing agent and finally with a water eliminating agent.

6. Process for the manufacture of saturated and unsaturated pregnane polycarbonyl compounds and their substitution products, comprising treating a pregnane derivative containing in 20-position an esterified hydroxyl group, and containing in the rings A and B merely a double bond, with an oxidizing agent capable of introducing esterified hydroxyl groups into the said rings, then saponifying all esterified hydroxyl groups present with a hydrolyzing agent, partially esterifying with an acylating agent and finally treating with a member of the group consisting of an oxidizing agent and a dehydrogenating agent capable of converting free hydroxyl to keto groups.

7. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely a double bond, with an oxidizing agent capable of introducing free hydroxyl groups into the said rings, and finally with a member of the group consisting of an oxidizing and a dehydrogenating agent, capable of transforming hydroxyl into keto groups.

8. Process for the manufacture of saturated and unsaturated pregnane polycarbonyl compounds and their substitution products, comprising treating a pregnane derivative containing in 20-position a member of the group consisting of a keto group and a free, esterified and etherified hydroxyl group, and containing in the rings A and B merely a double bond, with an oxidizing agent capable of introducing free and esterified hydroxyl groups into the said rings, then with a member of the group consisting of an oxidizing and a dehydrogenating agent, capable of transforming free hydroxyl into keto groups, and finally eliminating the introduced esterified hydroxyl groups with an acid eliminating agent.

9. A $\Delta^4$-pregnene-20-ole of the formula

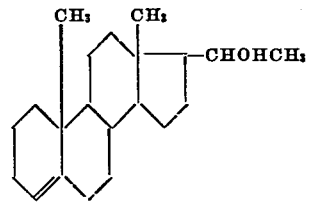

10. A $\Delta^4$-pregnene-20-ole-propionate of the formula

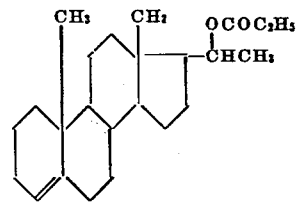

11. A pregnane derivative of the formula

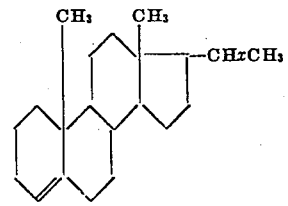

wherein $x$ is a member of the group consisting of a hydroxyl group and a group which upon hydrolysis is convertible into a hydroxyl group.

KARL MIESCHER.
ALBERT WETTSTEIN.